Jan. 26, 1960 R. WINFIELD 2,922,576
TIME OF EVENT INDICATOR
Filed July 9, 1958 9 Sheets-Sheet 1
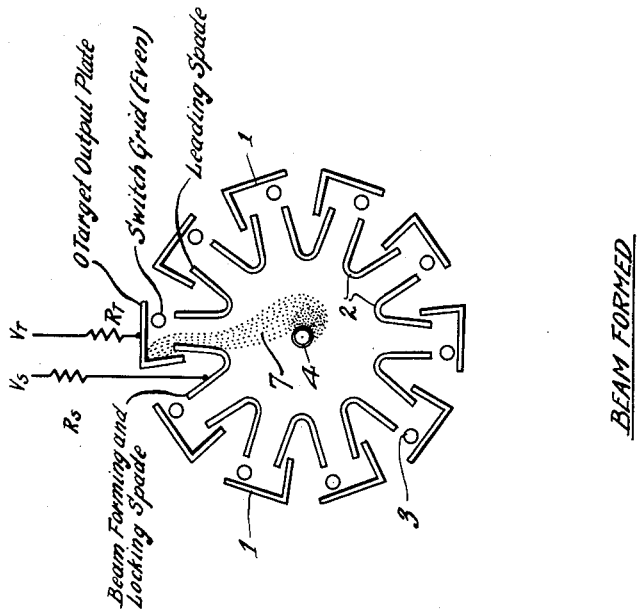
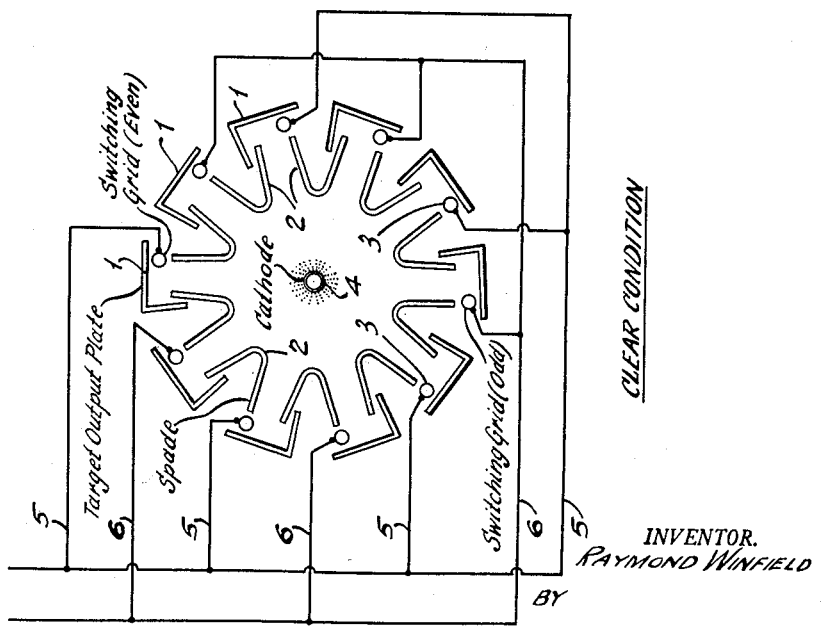
INVENTOR.
RAYMOND WINFIELD

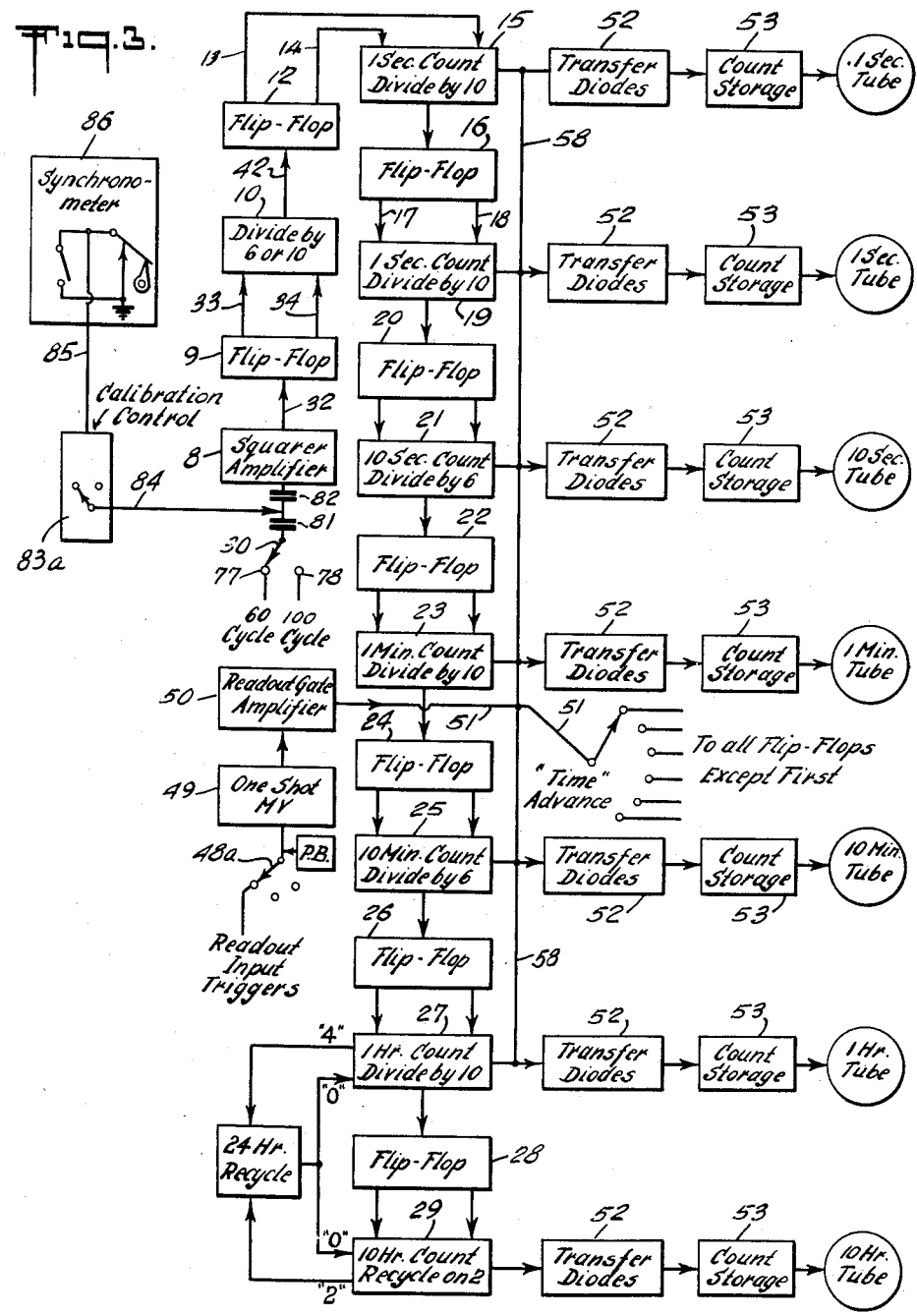

Jan. 26, 1960  R. WINFIELD  2,922,576
TIME OF EVENT INDICATOR
Filed July 9, 1958  9 Sheets-Sheet 3

INVENTOR.
RAYMOND WINFIELD
BY
ATTORNEYS

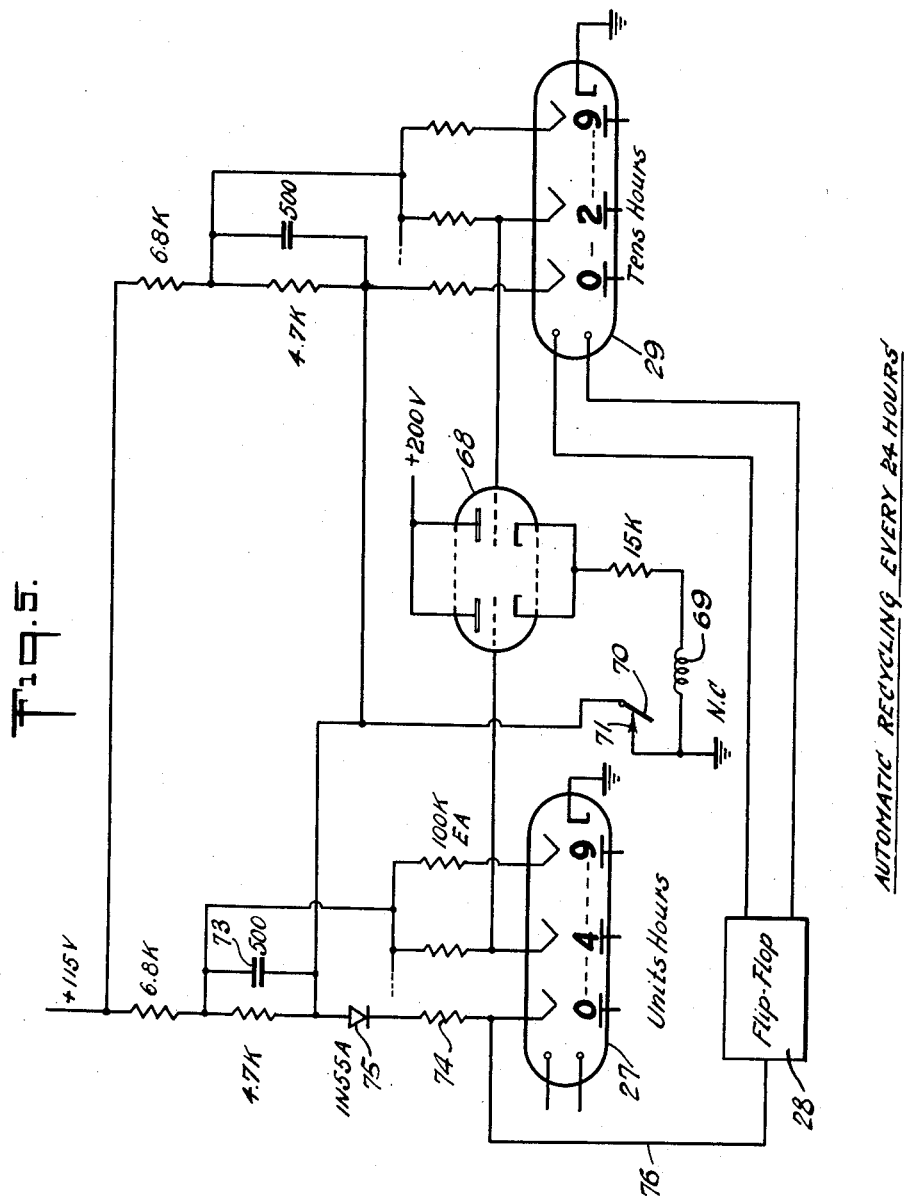

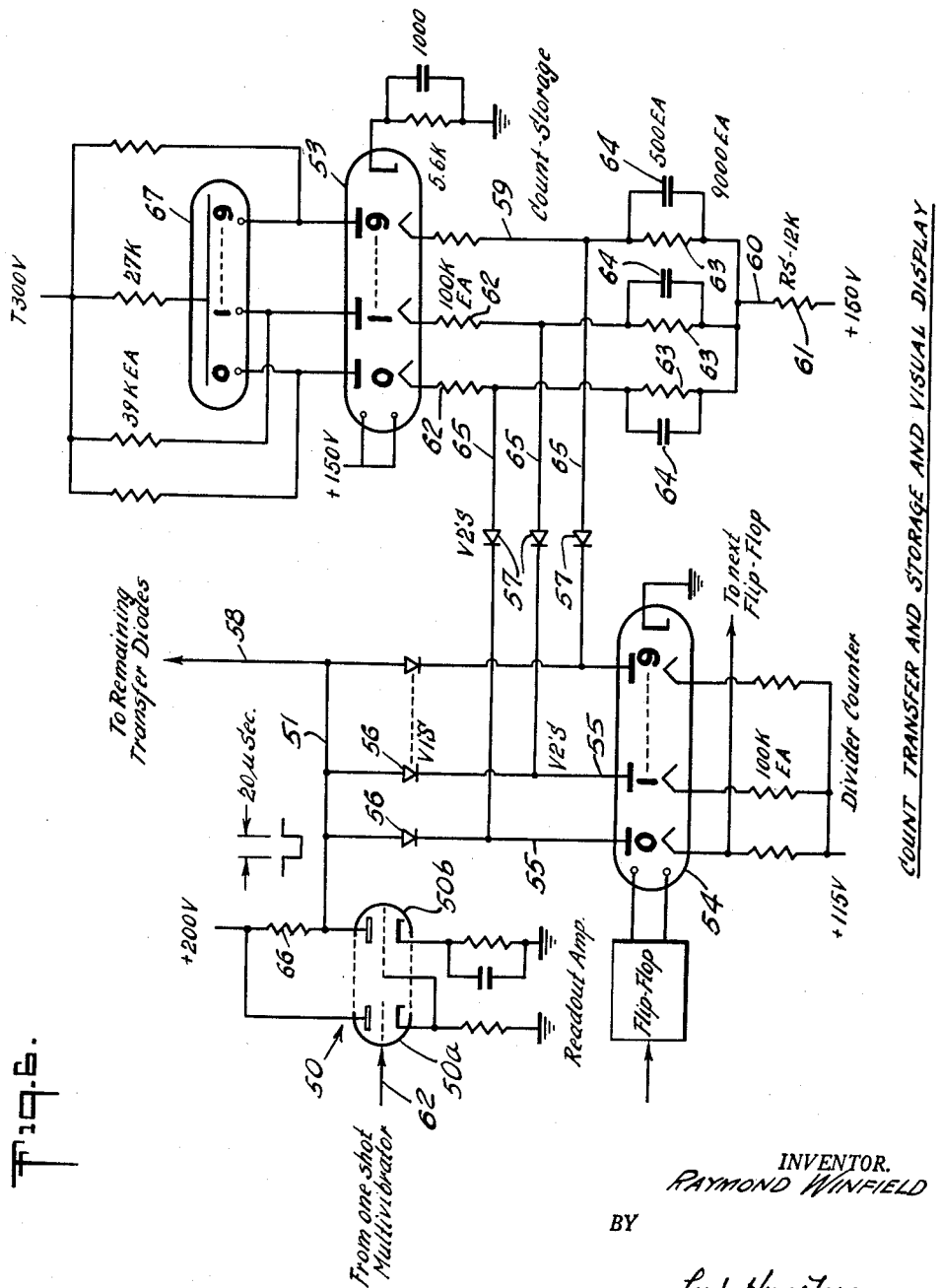

Jan. 26, 1960  R. WINFIELD  2,922,576
TIME OF EVENT INDICATOR
Filed July 9, 1958  9 Sheets-Sheet 6

INVENTOR.
RAYMOND WINFIELD
BY
ATTORNEYS

Jan. 26, 1960

R. WINFIELD 2,922,576

TIME OF EVENT INDICATOR

Filed July 9, 1958

INVENTOR.
RAYMOND WINFIELD

BY

ATTORNEYS

Jan. 26, 1960

R. WINFIELD 2,922,576

TIME OF EVENT INDICATOR

Filed July 9, 1958

INVENTOR.
RAYMOND WINFIELD

BY

ATTORNEYS:

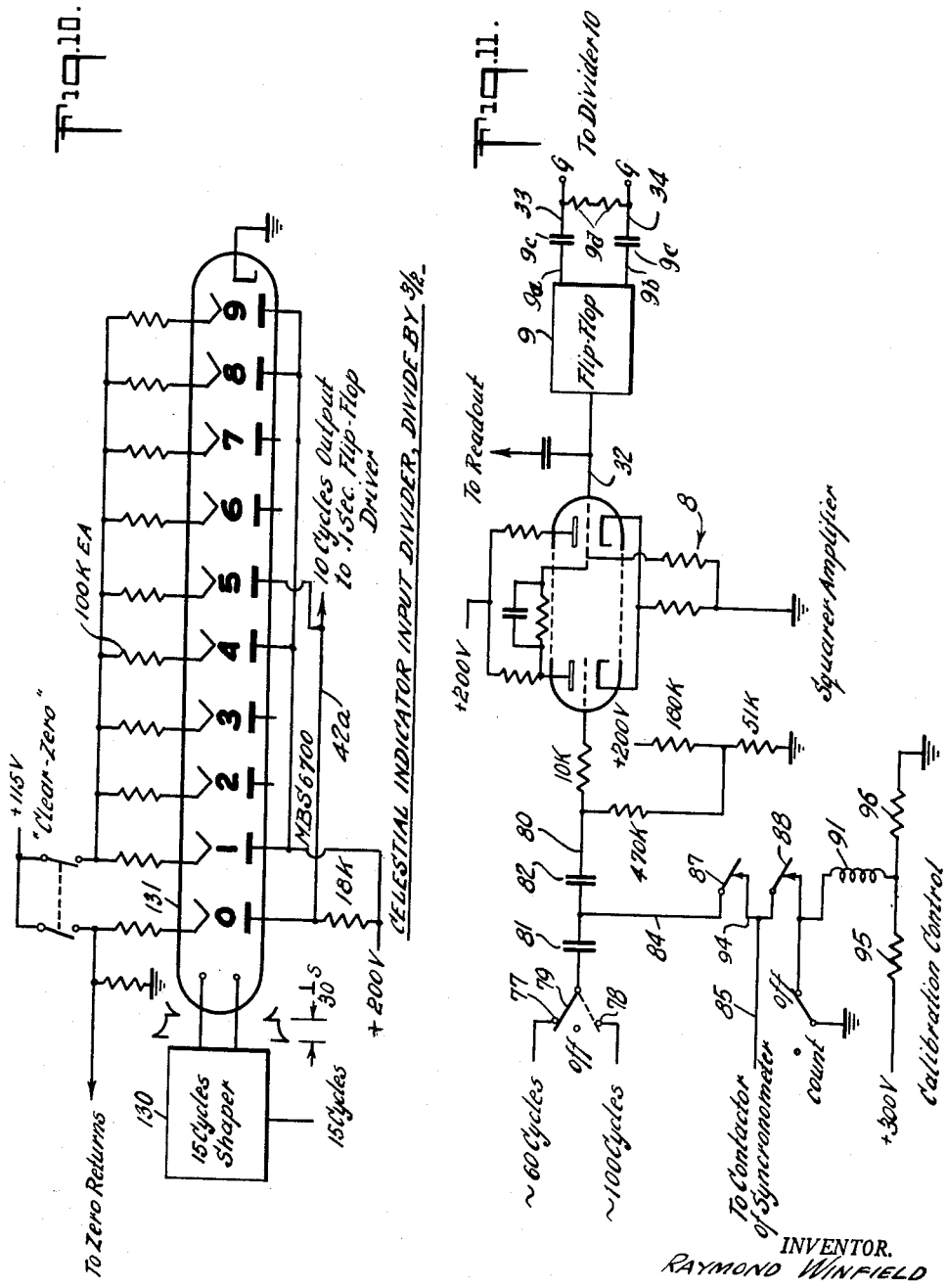

United States Patent Office 2,922,576
Patented Jan. 26, 1960

2,922,576
TIME OF EVENT INDICATOR
Raymond Winfield, Wantagh, N.Y.

Application July 9, 1958, Serial No. 747,549

12 Claims. (Cl. 235—92)

(Granted under Title 35, U.S. Code (1952), sec. 266)

The invention described herein may be manufactured and used by or for the Government of the United States of America for governmental purposes without the payment of any royalties thereon or therefor.

This invention relates to instruments operable to indicate the time when an event occurs that can be represented by a voltage pulse. It frequently happens that a person making certain observations wishes to make an instantaneous determination or indication of the absolute time of occurrence of a particular event or series of events, without interrupting his observations to ascertain or record the exact time. Such accurate time determinations are useful, for example, in computations to determine geographic positions, also in celestial navigation methods which employ coordinated time readings of star sightings.

Objects of the invention are to provide an improved time of event indicator, which will visually display the time when an event occurred as determined by a voltage pulse, which will normally continue to visually display such time of event until a new determination of a time of event is to be indicated, with which the act of indicating a new time of event occurrence will automatically terminate the previous indication, which can be adapted for applications of frequency measurements, preset counting, and interval timing with input repetition rates approaching one megacycle, which automatically recycles every 24 hours, with which any number of readouts or time indications can be obtained without disturbing the counting of time, with which visual time indications will appear immediately upon arrival of a readout voltage pulse with the time indicators changing from their previous time indication to the new time indication, with which no resetting or recalibration is necessary between successive time readings or indications, and which will be relatively simple, compact, practical, and dependable in construction and convenient in use.

Other objects and advantages will appear from the following description of two embodiments of the invention and the novel features will be particularly pointed out hereinafter in connection with the appended claims.

In the accompanying drawings:

Fig. 1 is a diagram illustrating the principle of a magnetron beam switching tube employed in the illustrated embodiment of the invention, with the tube in "clear" condition;

Fig. 2 is a similar diagram, but with the beam formed;

Fig. 3 is a block diagram illustrating the basic circuit arrangement;

Fig. 4 is a diagram illustrating the principle of the means for obtaining operation of a solar time indicator input divider tube employed in the illustrated embodiment of the invention;

Fig. 5 is a diagram illustrating the principle of the means for obtaining automatic recycling of the time counting every 24 hours;

Fig. 6 is a diagram illustrating the principle of the means for count transfer and storage and visual display;

Fig. 7 is a diagram illustrating the calibration input circuits;

Fig. 8 is a diagram similar to Fig. 7 but illustrating a modification thereof;

Fig. 9 is a diagram illustrating the means for obtaining manual time advance;

Fig. 10 is a diagram illustrating the use of a beam switching tube as a celestial time indicator input divider; and Fig. 11 is a circuit diagram illustrating a squarer amplifier and its connection to the balance of the circuits.

In the embodiment of the invention illustrated in Figs. 1-7, 9 and 10, and referring first to Figs. 1 and 2, use is made of any of the beam switching tubes which are available in the open market. One such type of tube, for example, is known as a Burroughs MS 6700 magnetron beam switching tube, manufactured by Haydu Brothers of Plainfield, New Jersey, a subsidiary of Burroughs Corporation. The principle of these tubes is illustrated by the diagrams of internal structure in Figs. 1 and 2. In Fig. 1 the tube is in clear or non-operating condition and in Fig. 2 the tube is in beam forming or operating condition. Such tubes may be made to have any desired number of beam positions, within limits, but for convenience use is made of ten beam position tubes since they are standard tubes and can be used for this time indicator and modified easily, when desired, for any lesser number of beam positions.

Each such tube has ten target plates 1, ten spades 2, and ten switching grids 3, arranged in a circular row about a central cathode 4 as shown in Figs. 1 and 2. One set of alternate grids such as for zero and even numbered positions are connected together by a conductor 5, and the other set of alternate grids $3b$ such as for the odd numbered positions are connected together by a conductor 6. The tube envelope is mounted permanently within a cylindrical magnet having an axial field coincident with the vertical axis of the tube envelope. Under typical operating conditions the cathode beam 7, illustrated by the group of dots in Figs. 1 and 2, forms a stable and locked in path to one of the ten target-spade combinations or pairs.

The cathode beam remains indefinitely in any such position until a suitable switching voltage is applied to the switching grids to advance the beam to the next target-spade combination or pair. When the tube is in clear condition, the cathode beam may remain cut off from any of the target spade combinations or pairs and the beam merely circles the central cathode in stable equilibrium. All spades are normally at the same positive potential. The beam may be formed on any one of the target-spade pairs and remain there in stable equilibrium by properly lowering the potential of the particular spade to which the beam is to go. When the beam is formed on the "0" or zero target-spade pair, the operation may be called "zeroing." The lowering of the spade potential may be done by momentarily shorting the spade to cathode.

To form the beam on a given position from another stable position to which the beam is already directed, the beam must first be "cleared" to the clear state and then reformed to the desired position. Clearing is accomplished similarly to that of beam forming with the additional momentary lowering of all other spades. The beam is cleared on the lowering of the potential on all spades and then it reforms on that spade whose rise back to the spade supply potential is retarded with respect to the other spades.

The target, spade and cathode form the equivalent of a pentode at constant grid potential. Almost all of the cathode current is collected by the target, enough current being intercepted by the spade, so that taken with the spade load resistor, the spade potential is at a value to maintain stable equilibrium. The potential of each spade with respect to the cathode may be several volts negative when the beam has formed on that spade. Once the beam has been formed in any given position, it may be advanced by applying a negative voltage to the switching grid between the present beam position and the advance position. The beam will then switch positions with a transient taking a fraction of a microsecond. When the beam is at its new position, if the next switching grid is also negative enough to maintain a switching action, the beam will continue on to the next position.

The switching action can be precisely controlled so that the beam is advanced for only one position for each input pulse. By applying the switching pulses in push-pull alternately to the two sets of switching grids, as indicated by the conductors 5 and 6, the beam can only advance one position since the next grid in sequence is not at the proper potential to maintain switching. Only a negative going switching pulse on a grid ahead of the present beam position serves to advance the beam. Once advanced, the beam finds a positive going grid ahead of it and therefore remains in its new position.

The block diagram shown in Fig. 3 illustrates diagrammatically the sequence of events and the relationship to one another of the parts employed. In this block diagram, a standard frequency input signal, such as a sine wave, 60 cycle signal, is fed through a squarer amplifier 8 and a flip-flop 9 to the first divider 10. The function of the squarer amplifier 8 is to convert the sine wave input time signal into a sharp rising pulse. For example, it sharpens a 60 cycle pulse to $\frac{1}{60}$ sec. Where the signal input it itself a sharp rising pulse, the use of the squarer amplifier is not necessary, because the sharp wave or signal will itself trigger the flip-flop 9. Squarer amplifiers are known, but the circuit of one is shown, by way of example, in Fig. 11 where it delivers a sharp rising pulse by wire 32 to the flip-flop 9. Flip-flop units are standard units available in the market under that name, so that illustration of the details of one is not necessary. A flip-flop has a condenser that sharpens the pulse and at each operation, the flip-flop provides a pulse of alternating polarity to each of the switching grids of the divider 10 or any divider or switching tube to which it is connected. When the flip-flop makes positive either one of the grids to which it is connected, the other grid will be made negative, and vice versa. It can be called a push-pull drive. The flip-flop can be replaced by any pulse shaping amplifier that drives the switching grids single ended.

The first divider 10 is necessary to convert the various input signals to a basic standard frequency of 10 c.p.s. to correspond to the minimum unit of time, such as tenths of seconds, which are to be visually displayed as hereinafter explained. After the first divider 10, additional dividers are cascaded to provide the remaining units of seconds, minutes and hours. Since the device is to be used continuously, automatic recycling after 24 hours is provided and will be explained hereinafter, but only the hours and ten hours dividers are affected because the previous or other stages are at "zero" in the normal count progression when recycling occurs.

The first divider 10 is connected to a flip-flop 12, and the latter is connected by wires 13 and 14 to the grid groups of count divider 15 representing the counting of tenths of seconds. This divider 15 is connected to the next flip-flop 16, and the latter is connected by the wires 17 and 18 to the grids of the next counter-divider 19 representing the unit seconds indications. This cascade connection through flip-flops and counter dividers continues successively through flip-flop 20, count divider 21 representing the tens range of seconds digits, flip-flop 22, counter divider 23 representing the units ranges of minute digits, flip-flop 24, count divider 25 representing the tens range of minute digits, flip-flop 26, count divider 27 representing the units range of hour digits, flip-flop 28 and the count divider 29 representing the tens range of hour digits.

Referring next to Fig. 4 which illustrates the circuits in the divider 10, a movable switch arm 30 is operable manually to connect by wire 31 a source of 60 cycle signals to the squarer amplifier 8. Switch arm 30 can also connect a 100 cycle signal source to wire 31 for celestial time indicator but the latter will be explained later herein. A connection 32 extends from amplifier 8 to the first flip-flop 9, and the latter is connected by wires 33 and 34 to the grid terminals 35 and 36 of the beam switching tube 37 of the divider 10. This tube 37 is illustrated diagrammatically in Fig. 4 with the cathode 4 shown at one end of the envelop of the tube, and with the ten sets of spades 2, ten sets of targets or plates 1. The ten switching grids 3 although not illustrated are connected in odd and even groups by wires similar to 5 and 6 of Fig. 1 to the grid switching terminals 35 and 36. These sets of spades and plates are labeled "0" to "9" on the drawing of Fig. 4.

The plates or targets 1 for the 0, 1, 4, 5, 8 and 9 beam positions are connected together by a common wire 38 which in turn is connected to a source 39 of positive voltage such as +200 volts. The targets 1 for the 2, 3, 6, and 7 beam positions are also connected together by a common wire 40, and the latter is connected to the movable contact arm 41 of a switch, one contact terminal of which is not connected to anything and the other of which is connected to wire 38. The switch arms 30 and 41 are ganged for operation together by the coupling shown by dash line, so that when arm 30 is in the position to connect the 60 cycle input pulses to the squarer amplifier the arm 41 will not be connected to anything, and when arm 30 is moved into its position to connect wire 31 to a signal of 100 c.p.s. the arm 41 will be connected to wire 38 and through it to the source of voltage such as +200 volts. In other words when dividing 60 c.p.s. by six to obtain 10 c.p.s. signals for divider 10, targets 2, 3, 6 and 7 are left with no return, and the beam will move through only six stations in each cycle of operation, which means that each of the six stations will represent $\frac{1}{10}$ sec. of time. When the switch arm 30 is moved to connect it to signals of a frequency of 100 c.p.s., then all of the targets will be connected to the common voltage through wire 38 and no skips will be made in the beam positions. Then each beam position will represent $\frac{1}{10}$ sec. of time.

The zero spade 2 of this tube 37 is connected by wire 42 to the next flip-flop, which would be 12, so that as the cathode beam completes its travel through a complete cycle and again reaches the zero spade, a pulse is sent through wire 42 to the next flip-flop to cause it to operate and reverse the polarities of the grids of the next beam switching tube. The spades for the beam positions 1 to 9 inclusive are all connected through individual spade load resistors 43 to a common wire 44 which leads to the corresponding common wires 44 of all other beam switching tubes in count dividers 15, 19, 21, 23, 25, 27 and 29. The spade for the zero position of the beam is also connected through a load resistor 45 to a wire 46 that is connected to zero returns of the other subsequent beam switching tubes in the series. Wire 46 is also connected to ground through a 1 megohm resistor 47. Wires 44 and 46 lead to separate stationary contacts of a switch 48, the two movable arms of which are ganged for concomitant operation, and when they are moved to engage with the contacts connected to wires 44 and 46, the contact connecting to wire 44 being made first and opened last. This switch 48 connects both wires 44 to 46 to a source of plus 115 volts, labeled "clear-zero" and its operation clears all of the beams to zero positions. This switch 48 is spring closed, but is operable manually to open position when one desires to clear the divider. When switch 48 is released it closes and causes the formation of the beam on the zero spade and target in all of the tubes of this series.

When the switch arm 30 is connected to a 60 cycle source of pulses, the targets for beam positions 2, 3, 6 and 7 are not connected to anything. Under this condition the beam, when switched to these positions, becomes unstable since the target voltage drops below the knee of the target current characteristic as the stray capacity is charged by target current. The net result is that the beam skips these positions and locks in on the first target with a normal return. Positions 2 and 3 are skipped with the beam locking in on position 4 and positions 6 and 7 are skipped with the beam locking in on position 8. Since four active positions have been eliminated, it now requires only 6 input pulses from a 60 c.p.s. signal to return the beam to the initial zero position. Since the flip-flop changes state once for each input trigger to the flip-flop, the advance of one position in the beam switching tube corresponds to one period of the pulse train at the flip-flop input. As a frequency divider, the circuit of Fig. 4 divides by 6 when the manual selector switch 30—41 is thrown to the divide by six position, shown in full lines in Fig. 4, in which only targets 0, 1, 4, 5, 8 and 9 are connected to the source of +200 volts. For division by ten, switch 30—41 is moved to connect all targets together and to the +200 volt source, and then the beam will advance one position for each switching pulse.

For all of the count divide, beam switching tubes and circuits will be similar to those shown in Fig. 4, except that for tubes 15, 19, 23 and 27 the switch 30—41 will remain in "divide by ten" positions, and for tubes 21 and 25, the circuits will remain in divide by 6 positions, and for tube 29 the switch will be in "divide by ten" positions but recycling will occur, as hereinafter explained, on the beam position "2," and its wire 42 will not go to the next flip-flop because there is no further flip-flop in the series.

From the foregoing it will be observed that when 60 cycle pulses are delivered to tube 37 (Fig. 4) and they are divided by 6 in that tube, the resultant pulses delivered to the first count divider 15 will be at the rate of ten per second, corresponding to one pulse for each tenth of a second. Each of the ten beam positions in the tube count divider 15 thus will represent 1/10 of a second of time, and all together will represent a total of one second of time. When the beam moves from the "nine" to the "zero" position in tube 15, it sends a pulse through its wire 42 to the next flip-flop 16, which operates to reverse the polarities on the grids groups 35 and 36 of the next tube 19, and the beam of that tube will advance one position so as to represent the lapse of 1 second which is in the units range of the seconds time. When the beam of tube 19 returns to its zero position, it causes the passing of a triggering pulse by its wire 42 to the next flip-flop 20 and the latter causes an advance of its beam through one of its six positions.

This tube has only six beam positions because there are sixty seconds in a minute and after the sixth beam position is reached in tube 21, its next movement is a return to its zero position. This return to its zero position causes the sending of a triggering pulse through the wire 42 of tube 21 to the next flip-flop 22 and through the action of the latter, the beam in tube 23 advances one of its ten positions corresponding to a change of one minute. When the beam in tube 23 passes its tenth position and returns to its zero position, it sends by the wire 42 of tube 23 a pulse signal to the next flip-flop 24 and the latter causes the beam in the next tube 25 to advance one of its positions corresponding to the tens range of minute time digits.

When the beam of tube 25 passes its "6" position it will return to its zero position because this represents a change from 60 minutes to one hour. In passing again to its zero position it sends a triggering pulse through wire 42 of tube 25 to the next flip-flop 26, and the latter then immediately causes the beam in tube 27 to advance one of its ten positions representing the units range of hour digits. When the beam of tube 27 passes from its "10" position back to its zero position, representing the passage of one hour, this sends a triggering pulse by its wire 42 to the next flip-flop 28, and the latter then advances the beam of tube 29 through one position such as from "one" to "two." Since this tube represents the tens range of hour digits, it need only have two beam positions. Thus the time pulses will store in the beam switching tubes 15, 19, 21, 23, 25, 27 and 29 by the positions of the beams in those tubes, indications of time by the hours of the day, subdivided to minutes, seconds and tenths of seconds. At the end of 24 hours the device recycles, as will be hereinafter explained, to set all of the beams at their zero positions, representing the time of start of a new day. Thus the positions of the beams in these divided tubes will at all times correspond to the actual time of day.

In order to indicate the actual accurate time when an event occurs, a second and equal group of similar beam switching tubes, identified for convenience in Fig. 3 as count storage tubes is provided, and when activated by a read out operation, to be explained later herein, will cause their beams to take positions therein corresponding to those existing at that instant in the related first group of such tubes. The beams in this second group of tubes will remain in these assumed positions until those tubes are again activated to indicate a new time of event. The purpose of duplicating the beam count positions in the various stages is to enable visual indication without interrupting the continuous time counting. The combined readout and count storage circuit is illustrated in Fig. 6 where advantage is taken of the pentode-like target characteristic for a free electrode output. At the time of arrival of a readout trigger, a 20 microsecond readout gate cuts off the normal divider target current return through a transfer diode and forces the target current to flow to the count storage spade return.

Referring first to Fig. 3, when one desires to indicate the time of an event, at the instant of the event a switch 48a is operated to send a readout trigger pulse to a one-shot multivibrator 49, and the latter sends a signal through a readout gate amplifier 50. This gate amplifier 50, as shown in Fig. 6, includes a cathode follower 50a whose cathode is connected to the grid of a cathode biased amplifier 50b. These gate amplifiers are known in the trade. The gate sends a readout negative signal of say 20 microseconds duration through wire 51 to all of a plurality of transfer diodes 52 (Fig. 3), one such diode 52 being provided for each beam switching tube of those tubes of the first group that are controlled by flip-flops. This causes the setting of the beams of the count storage tubes 53 forming the second group of beam switching tubes at positions corresponding to the beam positions at that instant in the related tubes of the first group.

Referring again to Fig. 6, the tube 54 may be considered as corresponding to any one of the beam switching or divider counter tubes of the first group, such as the tube 15, for example. Each of its targets of a beam position is connected by a wire 55 to two individual diodes 56 and 57, such as germanium diodes for example. The diodes 56 for all of the targets of each tube 54 are connected to the common wire 51 which is also connected to the diodes 56 of all of the beam switching, divider counter tubes of the first group. Each of the count storage tubes 53, which are beam switching tubes of the second group, has the same beam positions as the divider tube to which it corresponds.

In Fig. 6 the tube 53 has ten beam positions, the same as the tube 54 (which could be tube 15, 19, 23 or 27), and all of its spades are connected by individual wires 59 to a common wire 60 that in turn has in series therein a resistor 61 and is connected to a substantial plus voltage such as +150 volts. Each wire 59 has, in series therein and with each other, two resistors 62 and 63, and the resistance 63, which is furthest from its related spade has a condenser 64 connected in shunt across it. Each wire 59, between the two resistors 62 and 63 in series therein, is connected by a wire 65 to the diode 57 that in turn is connected by wire 55 to the target of the corresponding beam position in the related divider tube 54. The common wire 51 is also connected through a resistor 66 to a substantial plus voltage such as +200 volts.

The plus impulse from the multivibrator in passing the cathode follower, which is the first triode of readout amplifier 50, causes the amplifier, which is the second triode in amplifier 50, to deliver a negative pulse to wire 51. Because of the IR voltage drop across the resistance 66 in the connection of wire 51 to the source of +200 volts, the voltage at the wire 51 will be less than the +200 volts but normally adequate to maintain a beam in tube 54 through a diode 56. When the negative pulse (20 μ sec.) from the amplifier 50 is impressed on wire 51, it counteracts with the normal voltage on wire 51 and lowers the voltage on wire 51 enough so that the beam on the target then formed will not be sustained and that beam would normally clear. However, the +150 volts supplied through resistor 61, wire 60, and a wire 65 through a diode 57 to the wire 55 to the target on which the beam was previously formed takes over and maintains the beam on that particular target.

When this temporary beam maintaining circuit is operative, current in passing through the particular resistance 63 will charge the particular condenser 64 that is shunted across that resistance 63. At the same time this temporary maintaining current will cause an IR voltage drop across the resistance 61 and this will lower the voltage through all of the resistances 63 and hence a lowered voltage on all of the spades of the related count storage tube 53. This lowering of the voltage on all of the spades of tube 53 will cause the beam in that tube to clear and no beam will exist in that tube. At the same time, in the circuit through a particular resistor 63 through which current is momentarily flowing to a particular target in tube 54, the junction between the wire from the resistor 63 in use and the resistor 62 to the spade of tube 53, will have an additional voltage drop because of the IR drop in the particular resistor 63 in use, with no drop across the other resistors 63. The beam in tube 53 will then form on the spade with the lowest voltage, at the moment when the signal pulse in wire 51 ends, because then the other spades of tube 53 will return to normal voltage as current flow through resistance 61 ends and the normal voltage from wire 51 is reapplied to the targets of tube 54.

The condenser shunted across the particular resistance 63 which had just been in use and which was charged while current was flowing in that particular resistor begins to discharge as soon as current stops through that related resistor, and this discharge of this condenser causes a slight lag in the return of normal voltage of the spade in tube 53 to which the discharging condenser is connected. Due to this temporary lag of voltage return to one spade in tube 53, the beam in that tube will form on that spade and pass to the target related thereto. Thus a beam will be formed in tube 53 on the target thereof corresponding in position to the target of tube 54 on which the beam of that tube was formed at that instant. When the beam in tube 54 later changes, the beam in related tube 53 will not move until a new signal comes from the multivibrator and this action is repeated. The diodes 57 prevent passage of the target currents of tube 54 to the activating mechanism by which a beam is moved in tube 53. The tubes 53 thus at each readout have their beams moved to positions corresponding to the positions of the beams in the related tubes 54 and hold them in these positions until the next readout.

Suitable means is connected to the tubes 53 to make visible or determinable the positions of the beams in those tubes following a readout. In the illustrated embodiment of the invention, a plurality of visual indicating devices 67 in the nature of gas filled, cold cathode, numerical indicating tubes are employed, one for each tube 53. These tubes 67 are available in the market under the name of numerical indicating tubes, one of which, for example, is identified as a Burroughs numerical indicator tube HB 106. These tubes 67 have positions corresponding to those of the related tube 53, and the targets of each tube 53 are connected individually to corresponding terminals of the related tube 67. When target current from say the "1" beam position of a tube 53 enters the tube 67, it causes illumination of a number or symbol identifying it as "1," and similarly for the other beam positions, the tube 67 will indicate by a number or symbol the identity of the beam position in the related tube 53. Thus, one has, by the use of a tube 67 for each time interval to be indicated, a visual indication of the time at the time of the last readout operation even though time after that readout operation has continued. When a new readout is taken the tubes 67 are cleared and new visual indications of the new time of readout obtained.

Referring now to Figs. 3 and 5, the arrangement for automatic recycling every 24 hours will be described. Fig. 5 illustrates the circuitry used to return the unit hours digit and the tens hours digit indications to zero after each 24 hours operation. It employs a simple cathode follower type of coincidence circuit 68 driving a relay 69 whose contacts 70 and 71 are arranged to "clear" each divider tube for the "hours," and reform the beam on "zero" of each such tube when the relay is deenergized. When the unit hours digit stage reaches position "4" after the ten hours beam switching tube has already reached its "2" position, which would be a 24:00:000 time indication, both grids of the coincidence circuit are then near ground potential, and the cathode current decreases to a value too low to keep the relay energized. This is because the voltage on the "2" position of the tens digit range of the "hours" tube and the "4" position of the units digit range of the "hours" tube drops lower than the +115 volts or becomes slightly negative when the beam is formed on the spade targets of these "2" and "4" positions of the "hours" tubes. Thereupon the movable contact 70 of the relay is automatically moved (it is a normally closed relay) into engagement with fixed contact 71 which completes a circuit that closes and shorts both "0" spade returns to ground.

This rapidly clears the beams of both of the beam switching hours tubes 27 and 29, since no spade-target combination receives cathode current. Thereupon the "2" and "4" position spades of the tens hours digit range and the unit hours digit range quickly change to about 5/11 of the spade supply voltage. The coincidence circuit again has both of its grids at high positive potential and the relay 69 reenergizes as the coincidence cathode current increases. This allows the common spade bus for the "1" to "9" spades to rise to the spade supply voltage. Because of the 6.8K and 4.7K divider across the spade supply for the "1" to "9" spades, formed when the return was grounded by the relay contacts 70 and 71, the "0" spade is less positive than all of the other spades at the moment the ground connection is broken by relay 69.

In addition, the fractional part of the spade supply voltage set up across the 4.7K resistor is in series only with the "0" spade circuit and further serves to keep the "0" spade less positive than all other spades of the same tube. The capacity 73 across the 4.7K resistor retards the rise of the "0" spade voltage back to the regular spade supply voltage. These conditions satisfy the requirements for beam forming from an already formed "2" and "4" position, with the net result that the beams in both the tens unit digit hours and unit digit hours beam switching tubes are formed on "0" shades in stable equilibrium until the next switching grid pulses are received. This completes the automatic recycling. In the connection between the 4.7K resistor and the "0" spade position, a resistor 74 and a diode 75 are included in series therein, with the diode 75 furthest from the beam switching tube. A wire 76 from the "0" spade position of the units hours beam switching tube 27 leads to the flip-flop 28 that controls the grids of the tube 29. The diode 75 prevents a recycling transient from triggering the flip-flop 28 and thereby causing an error.

Considering next the calibration input circuits, and referring particularly to Figs. 3 and 7, the calibration of the indicator includes setting of the time indicator to any arbitrary advanced time, with the standard frequency input pulses to the counting channel shorted, and then unshorting the input during the last second before the exact time previously set on the time indicator, to start the continuous time counting. For example, if the indicator has been arbitrarily set for 09:45:000, the contactor of the synchronometer must be manually unshorted between 09:44:590 and 09:45:000 or within one second. This will allow only a single contactor opening that has been previously shorted, corresponding exactly to the commencement of the first second beginning at 09:45:000, to unshort the standard frequency input. Further contactor openings have no effect on the circuit. By watching the synchronometer second hand (not shown), the operator can easily unshort the contactor at the right moment.

In Figs. 3 and 7, contacts 77 and 78 are connected respectively to 60 cycle and 100 cycle sources of input signals, and the switch arm 30 is movable to connect with such contacts alternately. Arm 30 is connected to the squarer amplifier 8, by conductor 80 with two condensers 81 and 82 in series therein. The calibration control 83, shown as the parts included in dash lines 83a in Fig. 7, is connected by wire 84 to the conductor 80 between condensers 81 and 82. The calibration control is connected by wire 85 to a synchronometer 86. The calibration control 83 in the example illustrated in Fig. 7 includes two normally closed, movable switch arms 87 and 88 engaging with contacts 89 and 90. Both switch arms are ganged or coupled for operation together by relay winding 91. A manually operable switch arm 92 is movable between "off" and "on" contacts, and itself is grounded. The "off" contact is connected by wire 93 to contact 90 of the relay operated switch and movable arm 88 of that switch is connected by wire 94 to contact 89 of that switch.

One end of relay winding 91 is connected to the wire 93 and the other end of that relay is connected through a resistance 95 to a source of positive voltage, such as plus 300 volts, and through a resistance 96 to ground. The wire 94 of the relay operated switch is connected to the wire 85 that leads to the synchronometer 86. The wire 85 is also connected through a condenser 97 to ground. In the synchronometer 86, the wire 85 is connected to the movable switch arm 98 which is normally urged into closed position in engagement with contact 99. Arm 98 is operated into open position by a cam 100 rotating in the direction of the arrow at a selected timed rate. Contact 99 is grounded by wire 101. A manually movable switch arm 102 is connected continuously to wire 85 and it is normally closed by contact with a fixed contact 103 which is also grounded.

In the operation of the circuit shown in Fig. 7, the manually operated switch arms 92 and 102 are respectively in "off" and closed positions. The relay 91 is energized by current from said source of +300 volts passing through resistance 95, winding 91, wire 93, switch arm 92 to ground, and also by a branch or shunt circuit from wire 93 through relay switch arm 88, wires 94 and 85, switch arm 102 and contact 103 to ground, with switch 102—103 shunted by cam operated, normally closed switch 98—99 to ground. Thus relay winding 91 is normally initially energized by closing switch 92 to "off" position. Relay winding 91 when thus energized closes its switch arms 87 and 88 and arm 88 in closing then closes the two shunt circuits to ground through the synchronometer. With this condition of the switches and with arm 30 connected, for example, to a source of 60 cycle voltage, the 60 cycle pulses from switch arm 30 will attempt to pass to the squarer amplifier 8, but since wire 84, which is connected to wire 80, is grounded through both the calibration control and the synchronometer, all of such pulses will pass to ground instead of to the squarer amplifier 8.

When starting the device, after the switch arm 92 has been moved to "on" position, to open the primary energizing circuit of relay winding 91, the pulses will still be grounded through the manually operated switch arm 102 and the cam operated switch arm 98. One waits until during the last second of time before the pre-set time indicators are to start and then the switch arm 102 is moved to open position which leaves only one shunt still active and that is through the cam operated arm 98. Cam 100 is rotating at a standard speed and cams arm 98 to open position in passing once each second of time. Therefore, the cam will, at the exact time for which the time indicators have been set, move arm 98 to open circuit position. At this time there are no ground shunts connected to wire 80, and hence the signal pulse at the exact time will then pass to the squarer amplifier 8 and then on through flip-flop 9 to the divider 10 and operate the time counting and indicating means. When switch arm 98 was moved by cam 100 to start the device, this opened the circuit of relay winding 91 and the deenergization of this relay caused an opening of circuits at the arms 87 and 88. Hence the only way that relay winding 91 can be reenergized is to manually move arm 92 back to the "off" position. This is not done until recalibration is again intended.

In the modification of the calibration circuits, as shown in Fig. 8, the circuits are the same as for Fig. 7 except that the squarer amplifier 8 and first flip-flop 9 are replaced by a shaper 104 whose output wires 105 and 106 are connected to the switching grids of divider 10 in the same manner that the output wires of the first flip-flop 9 of Fig. 7 was connected to the grids of divider 10. Since squarers are known in the art a detailed description of the same is unnecessary. The leads 105 and 106 are taken from plates 107 and 108 of the double triode tube 109 and contain condensers 110 in series therein. Two resistances 111 and 112 are connected in series with each other beyond the condensers 110, and a positive voltage source, such as +32 volts, is connected to the junction between the resistors 111 and 112. The fluctuations of the plate voltages in tube 109 as the signal pulses are received from wire 80, when modified by the plus voltage connected to the junction between resistors 111 and 112 will cause the desired changes in the leads 105 and 106 to the switching grids of divider tube 10.

In placing the event indicator in operation, it is desirable, as explained hereinabove, to manually advance the times indicated to a selected arbitrary time indication, at which time the device is to be set in operation. One means for doing this is illustrated in Fig. 9, where it is combined with the read-out circuits. After manually forming all of the beams in the divider beam switching tube 10 by shorting the "0" spade returns, the beam positions are manually advanced in each divider by triggering the flip-flop drivers of a given stage until the arbitrary time setting selected for calibration is reached. By advancing the beam at least one position before setting it on its calibration reading, the flip-flop is automatically in the proper state to advance the beam in the divider beam switching tube when the first time pulse arrives after operation begins. As each position is manually advanced, a readout trigger is delivered to the readout circuits, so that the numerical indicator tubes show the changing beam positions. A diode between the preceding output spade and the following flip-flop prevents the manually generated pulse from upsetting the beam position which might otherwise advance or clear.

In Fig. 9 the wire 49a which connects a manually movable, readout switch arm 48a to the multivibrator 49, has a condenser 113 in series therein. A push button switch PB has a switch arm 114 movable alternately between fixed contacts 115 and 116 and is itself grounded through a condenser 117. The contact 115 is connected to a source of +100 volts and contact 116 is connected by a wire 118 through a diode 119 to one end of a wire 120 that has a condenser 121 in series therein. Wire 120 is connected at its other end to the input side of the multivibrator 49 between the latter and the condenser 113. A wire 122 with a condenser 123 in series therein connects contact 116 to ground, and a wire 124 with a condenser 125 in series therein is connected between the end of wire 120 to which wire 118 is connected and ground. The gate amplifier 50 is known in the art and hence needs no detailed description.

To manually advance the time, one merely operates push button switch PB to connect switch arm 114 with contact 116 momentarily. While arm 114 was in engagement with contact 115, the source of plus voltage, such as +100 volts, was connected to ground through the condenser 117 and charged the latter. When arm 114 then was moved to engage contact 116, the charged condenser 117 was then connected through wire 118, diode 119, wire 120 and condenser 121 to the one shot multivibrator 49 and this delivered an activating pulse to the vibrator 49. The condenser 117 is slowly discharged at each operation of push button switch arm 114 by a resistance 126 connected in shunt between ground and the junction between wires 118 and 120. The diode 119 and condenser 125 together act as a peak detector which charges up to the first voltage pulse and holds that voltage, and the condenser 123 smooths out the delivered pulse. The condenser 121 differentiates the pulse and delivers a trigger pulse to the multivibrator. These details are important in making certain that only one operating pulse reaches the multivibrator for each operation of the push-button switch arm 114. In manual operation of arm 114, this arm might bounce slightly and deliver more than one pulse to the multivibrator, unless prevented by the action of the diode 119 and condensers 123 and 125.

The output wire 51 from the readout gate amplifier is connected to the wire 58 that leads to all of the transfer diodes, and also is connected, with a condenser 51a in series therein, to a movable switch arm 127. Arm 127 is manually movable into individual engagement successively with a row of contacts 128 each of which is connected to an individual flip-flop. There is a contact 128 for connection to each flip-flop except the first one 9. One of such connections to the flip-flop 12 is illustrated for the lowermost contact 128 in Fig. 9, and that connection from contact 128 to flip-flop 12 is connected to the spade of the "0" beam position through an isolation diode 129 that prevents a manually generated pulse from disturbing a previous counting tube condition. Thus one may set the arm 127 in engagement with the contact 128 that leads to any flip-flop except 9, and then operate push button PB switch arm 114 as many times in succession as are necessary to advance the switching tube controlled by that flip-flop to the desired beam time indication for that tube.

Switch arm 127 is then moved to the contact 128 that is connected to the next flip-flop controlling the beam in the next beam switching tube in which an advance of its beam position is desired, whereupon push button PB switch arm 114 is again closed in succession as many times as necessary to obtain the desired advance of the beam position. This is continued until all of the beams in the various switching tubes have been given the desired time indicating positions. The switch arm 114, after each operation returns, under bias, to engagement with contact 115 so that the condenser 117 will be recharged for each subsequent operation.

The input divider 10 has been described as used for indications of solar time, but at times it may be desirable to use celestial time and the changes for divider 10 for that purpose are illustrated in Fig. 10. The celestial time-of-event indicator uses a 3/2 division in the first divider 10. Two major differences exist between this divider of Fig. 10 and the solar circuit shown in Fig. 4. The celestial driving frequency is derived from the 60 cycle frequency by means of a gear train to obtain a celestial 15 cycles per second frequency standard. The output pulse is taken from the target instead of the spade, and the switching grids move the beam along at twice the rate with respect to the input frequency. The switching rate is doubled because the output of the shaper 130, which is used instead of the squarer and flip-flop of Fig. 4 to control the grids of divider tube 131 that replaces divider 10 of Fig. 4, reverses at each half cycle of the input and therefore twice per period. This produces frequency multiplication by 2 and the beam switching circuit target arrangement produces division by 3 for a net frequency division by 3/2.

Leaving targets 2, 3, 6 and 7 open as in Fig. 4 allows the beam to skip 4 positions with a resultant division by 6, with respect to switching grid pulse frequency, if the output were taken from one of the active spades. By taking the output from 2 targets, tied together, an output pulse is delivered twice per complete beam rotation instead of once, reducing net division from 6 to 3. Two spades cannot be tied together in a similar manner since the beam tends to lock in on a leading spade and therefore the two tied positions do not behave independently as is the case when the targets are tied. Another difference from the tube used for solar time (Fig. 4) is that the wire 42 of Fig. 4 is replaced by a wire 42a (Fig. 10) that connects the zero position target and the "5" position target to the 0.1 sec. flip-flop driver.

Squarer amplifiers are known in the trade, but in Fig. 11 the circuit of one is illustrated by way of example and to show how it is connected to the 60 cycle or 100 cycle sources, and to the first flip-flop 9. In each of the connections 9a and 9b from flip-flop 9 to the grids of the beam switching tube used as a divider, a condenser 9c is connected in series, and two resistances 9d are connected in series with each other and across the connections 9a and 9b. These last mentioned condensers and resistances serve to sharpen the waves from the flip-flop 9 to the grids of tube 10.

It will be noted that no resetting or recalibration is necessary between successive time readings, and upon the occurrence of a particular event, a time reading is caused to appear on the numerical indicators which remains until a subsequent event produces a new time reading. No adjustment or resetting of the time indicator is required before the next event time indication can occur. In this way the time indicator is available for any number of time readings within the long-time recalibration period. Recalibration is required only when the elapsed operating time of the frequency standard is great enough to allow the probable frequency standard's deviation to exceed the allowable time error. One type of radio frequency standard will allow several days operation without producing significant error in the 0.1 second numerical indicator reading.

While the structure disclosed as an entirety is particularly advantageous as a time of event indicator and has been so identified, certain sub-combinations thereof have other commercial uses. For example, the count divide tubes 15, 19, 21, 23, 25, 27 and 29 with their flip-flops may be considered as pulse counters in that they count the time pulses received by them from the divide tube 10. They count the pulses regardless of their frequencies, and by operating the read out means, one can visually indicate a sub-total or reading of the count at any time without disturbing or interrupting the regular count and hold that visual indication of the sub-total count until a new visual sub-total or reading of the count is obtained. Such a device could be used to count operations performed or articles passed by counting electric pulses created by the operation or article, and a supervisory person nearby or at a distance away could at any time while the counting continued, activate the visual indicating means to indicate visually to him the exact count at the instant of such activation which could be held until the next activation is made of the visual indicating means.

It will be understood that various changes in the details and arrangements of parts, which have been herein described and illustrated in order to explain the nature of the invention, may be made by those skilled in the art within the principle and scope of the invention as expressed in the appended claims:

I claim:

1. An electronic time of event indicator, which comprises a source of standard frequency input signals corresponding to selected minimum time intervals, one group of beam switching tubes, one of such tubes serving for each range of digits of time subdivisions to be determined, each tube having successive beam positions corresponding in number to the subdivisions of time in its said range, another group of beam switching tubes corresponding in number to those of said one group, means controlled by successive input signals from said source for advancing the beam positions in each of the tubes of said one group in timed sequence, means activated by the beam positions in each tube of said one group for automatically causing the beam in the related tube of said other group to take a corresponding beam position, selectively operable means for making said last named means effective or ineffective, a plurality of direct reading, numerical indicating tubes, each capable of selectively indicating visually any number from zero to nine inclusive, one indicating tube for each range of digits of time to be indicated, and means including connections from each numerical indicating tube to a corresponding tube of said another group, and operable to cause visual indication of a numeral in that indicating tube corresponding to the beam position in the related tube of said another group.

2. The indicator as set forth in claim 1, and means for causing the beams in all of the tubes of said one group to assume zero positions at the end of each time day.

3. The indicator as set forth in claim 1, wherein said selectively operable means includes a manually operable switch, which, when operated, will cause the tubes of said second group to be activated to acquire the same beam positions as those in the related tubes of said one group.

4. A time of event indicator which comprises one group of beam switching tubes, one for each range of digits of time subdivisions to be determined, each tube having successive beam positions corresponding in number to the subdivisions of time in its said range from zero to the highest subdivision in that range, another group of similar beam switching tubes one for each tube of said one group, means responsive to timed input pulses for progressively causing a step by step advance of the beam positions in each of the tubes of said one group in accordance with the time intervals which they correspond to and repeating the cycle of advances after each complete range of movement of its beam, means activated by the zero position of the beam in each tube except for that tube having the highest range of time to be indicated for causing a one-step advance of the beam in the tube representing the next larger range of time intervals, selectively operable means for causing formation in the tubes of said other group of beams corresponding in position to the beams in the related tubes of said one group at that time and retaining those positions, means connected to said tubes of said other group for visually indicating by numbers the beam positions so produced in these other tubes.

5. The indicator as set forth in claim 4, and means for automatically causing a recycling of the beam positions in the tubes of said one group to zero at the end of each time day.

6. The indicator as set forth in claim 4, and manually controlled means for sending activating pulses selectively to the tubes of said one group to advance the beam positions therein until they indicate a selected time at which the indicator is to be started in operation.

7. The indicator as set forth in claim 5, and means for starting operation of the indicator at said selected time comprising means for shunting to ground said timed input pulses, and means for unshunting said timed input pulses during the last fraction of time of the smallest time subdivision indicated by said visual indicator, to enable the input pulses to begin operation of the device exactly at said selected time.

8. A time of event indicator which comprises a plurality of timer units for counting time in selected subdivisions of time and operable by input time pulses of a selected frequency to count time in said selected subdivisions, means for delivering pulses to said units to preset them to represent a selected future time, and means for temporarily shunting said input time pulses away from said pre-set units to prevent actuation of said units and including a pair of branch shunts connected in parallel, one of said shunts having in series therein a manually operable switch, a cam, means for operating said cam at a uniform rate with a cycle corresponding to the smallest time subdivision being counted by said units, a normally closed switch in series in the other of said branch shunts and opened by said cam at each cycle of operation of the cam, whereby said manually operated shunt switch may be opened during the last time interval of the smallest time subdivision as represented by said units before the time counted in said units, and then the cam operated switch may automatically unshunt the input time pulses at the end of said last time interval so as to initiate operation of said units, at exactly the time for which the units were preset, and means for incapacitating said pair of branch shunts automatically when said cam operates said shunt to initiate operation of said units to count time.

9. A device for continuously counting impulses and operable selectively at any time to visually indicate the total counted as of that time and holding that indication until a new visual indication is made which comprises a counting unit responsive to repeated input pulses and operable for continuously counting the input pulses delivered thereto, means connected to said counter and operable when activated to indicate visually the total of such pulses counted in said unit as of the time of such activation and to hold such visual indication until its next activation, and means selectively operable for activating said visual indication means whenever a visual indication is desired, said input pulses having a selected uniform time frequency, and means for dividing such pulses to a time frequency corresponding to the smallest subdivision of time to be counted in said counting unit, and said indicator being operable to indicate the total of such time counts in said counting unit according to conventional subdivisions of time, wherein said input pulses are very rapid in order to make possible the subdivisions of time to be counted into fractions of a second, and calibrating means for said counting unit which comprises means for presetting said counting unit while idle to a selected time at which it is to be started into operation, means for temporarily shunting said input time pulses away from said counting unit after said presetting to prevent operation of said unit by said time pulses, including a shunt having two branches in parallel, one of said shunts having in series therein a manually operable switch, a cam, means for operating said cam at a uniform rate with a frequency cycle corresponding to the smallest time subdivision being counted in said unit, a normally closed switch in series in the other of said branch shunts and operated to open position by said cam at each cycle of operation of the cam, whereby said manually operated shunt switch may be opened during the last time interval of said smallest time subdivision before said preset time, and the next operation of the cam operated switch will open the other shunt at the exact time when counting of time is to begin, and means for incapacitating said pair of branch shunts automatically when said cam operated switch is operated to initiate operation of said units.

10. A time of event indicator which comprises means for supplying signal pulses of uniform frequency corresponding to the smallest subdivision of time to be indicated, a group of beam switching tubes arranged in a series, one tube for each range of digits of time subdivision to be determined, a flip-flop connected between said supplying means and the first tube of the series representing the highest range of digits of time subdivisions to be determined, and between each pair of adjacent tubes in the series, said flip-flops being operable upon receiving a pulse for causing a selected advance of the beam in its cycle in the next tube in the series, said first flip-flop being operable to cause a beam advance in the first tube in the series upon receipt of a time pulse from said means, and each other flip-flop being activated by the zero position of the beam in the tube from which it receives its pulses, means for visually indicating said time positions of the beams in the beam switching tubes includes a second series of beam switching tubes, each connected to a related tube of the first mentioned series of tubes and operable when activated to cause its beam to assume a time position in the tube corresponding to the beam position in the tube of the first series to which it is connected, and a plurality of gas-filled, direct reading, numerical indicating, glow tubes one connected to each beam switching tube of said second series, and operable to visually indicate a number corresponding at any time to the beam position in the beam switching tube to which it is connected, and means for selectively activating said last named means, the selectively activating means when effective causing activation of the beam in each of the tubes of the second series to positions corresponding to the beam positions in the tube of the first series to which that tube of the second series is connected.

11. The indicator as set forth in claim 10, and means for delivering pulses directly, individually and selectively to all of said flip-flops for advancing the time positions of the beams in the tubes to represent a selected time subdivision when operation of the indicator is to be started.

12. The indicator as set forth in claim 10, and a manually operable push-button switch, means activated by operation of said push-button switch for delivering a single sharp pulse, for each operation of the switch, individually and selectively to each of said flip-flops for advancing the time positions of the beams in the tubes to represent thereby a selected time subdivision when operation of the indicator is to be initiated.

References Cited in the file of this patent

UNITED STATES PATENTS

| | | |
|---|---|---|
| 2,841,334 | Abate | July 1, 1958 |
| 2,871,399 | Scuitto | Jan. 27, 1959 |